United States Patent [19]

Bamberger

[11] 4,414,187

[45] Nov. 8, 1983

[54] PREPARATION OF METAL PHOSPHATES BY A REACTION USING BORON PHOSPHATE

[75] Inventor: Carlos E. Bamberger, Oak Ridge, Tenn.

[73] Assignee: The United States of America as represented by the U.S. Department of Energy, Washington, D.C.

[21] Appl. No.: 379,801

[22] Filed: May 19, 1982

[51] Int. Cl.$^3$ .............................................. C01B 25/26
[52] U.S. Cl. .................................... 423/251; 423/250; 423/253; 423/278; 423/289; 423/292; 423/293; 423/311
[58] Field of Search ............... 423/277, 278, 289, 292, 423/293, 305, 311, 250, 251, 253

[56] References Cited

U.S. PATENT DOCUMENTS

| | | | |
|---|---|---|---|
| 3,895,095 | 7/1975 | Kobylinski et al. | 423/305 |
| 3,914,381 | 10/1975 | Sugahara et al. | 423/305 |
| 4,014,813 | 3/1977 | Shidlovsky | 423/305 |

OTHER PUBLICATIONS

Thesis titled "Microscale Preparation and Characterization of Selected Lanthanide and Actinide Phosphates," submitted by Stephanie Ann Morris to the University of Tennessee, in Dec. 1981.

*Primary Examiner*—Edward J. Meros
*Assistant Examiner*—Wayne A. Langel
*Attorney, Agent, or Firm*—Edwin D. Grant; Stephen D. Hamel; Richard G. Besha

[57] ABSTRACT

Metallic phosphates are prepared by heating mixtures of $BPO_4$ and a metallic oxide or salt.

1 Claim, No Drawings

PREPARATION OF METAL PHOSPHATES BY A REACTION USING BORON PHOSPHATE

BACKGROUND OF THE INVENTION

This invention, which resulted from a contract with the United States Department of Energy, relates generally to the formation of metal phosphates and particularly to the formation of phosphates of those metals that are produced by fission and/or neutron capture in a nuclear reactor.

Synthetic monazite (a mixed lanthanide-actinide orthophosphate) has been suggested as a suitable material for long-term storage of nuclear wastes. To adequately evaluate this waste containment form, it is necessary to establish an economic, safe and reliable method by which lanthanides and actinides can be converted to phosphates. Metal phosphates have been prepared by precipitation from aqueous solutions containing ions of the metal and a particular phosphate. This procedure requires a prior dissolution of the metal compound, which is difficult to carry out with the radioactive metal compounds present as wastes in nuclear fuel reprocessing streams because they are refractory. Another method for the preparation of metal phosphates is to react ammonium phosphate with metal oxides or salts at temperatures in excess of 1200° C. Under such conditions, the reactants of this process are very corrosive to reaction vessels, and the reaction also evolves a large amount of gas. Crystalline lanthanide orthophosphates have been prepared by reacting a lanthanide oxide with $Pb_2P_2O_7$ at a high temperature, followed by crystallization of the lanthanide orthophosphate on cooling. However, in this process excess $Pb_2P_2O_7$ must be removed by long periods of boiling the product in concentrated nitric acid.

SUMMARY OF THE INVENTION

It is an object of this invention to provide a simple and effective method of preparing a metal phosphate. The method of the invention utilizes the reaction of one solid, boron phosphate, with another solid, a metallic oxide or salt, at an elevated temperature to yield a metal phosphate and a boron oxide or salt. In the reaction, boron in $BPO_4$ is replaced by a metallic ion because of the higher stability of the metallic phosphate that is formed. In some reactions within the process of the invention, small volumes of gases may be evolved, depending on the chemical compound containing the metal. If required, $B_2O_3$ can be removed from the metallic phosphate product by dissolution in water. If excess $BPO_4$ has been used, the unreacted portion can be leached out of the product with warm 0.5 N NaOH solution without adversely affecting the metal phosphate.

DETAILED DESCRIPTION

Some of the reactions within the scope of the invention can be represented by the following equations:

$$2BPO_4 + 2XO_2 \rightarrow 2XPO_4 + B_2O_3 + \tfrac{1}{2}O_2 \quad (I)$$

$$2BPO_4 + Y_2O_3 \rightarrow 2YPO_4 + B_2O_3 \quad (II)$$

$$2BPO_4 + ZO_2 \rightarrow ZP_2O_7 + B_2O_3 \quad (III)$$

where X, Y, and Z are different metallic elements.

In some uses, $B_2O_3$ produced by these reactions can be left with the product phosphate. In other situations, it can be easily separated from the phosphate by extraction with water. Only in those cases in which the lower valence metal ion is more stable as a phosphate than the higher valence in the starting oxide is oxygen gas released (Equation I). If, instead of oxides, other compounds such as carbonates, nitrates, sulfates, or other salts are used, additional gases stemming from the anions of the salts will also be evolved.

Boron phosphate was prepared by slowly firing a syrupy stoichoimetric mixture of $H_3PO_4$ and $H_3BO_3$ in air until a constant weight of the mixture was attained. The solid was ground, refired, and slurried in hot water to remove any unreacted components. After filtration and refiring, the solid was reground and then used, X-ray diffraction being used to confirm the identity of $BPO_4$. It is a common practice to conduct experiments in nuclear fuel reprocessing research with cerium because its chemical behavior resembles that of plutonium. Mixtures of $BPO_4$ and $CeO_2$ (typically 5.6 g and 9.7 g for the respective compounds) were ground and placed in platinum or silica boats which were transferred into silica tubes. Each tube was closed at one end and had provisions for thermocouples and a gas inlet and outlet. The tube assembly was placed in a horizontal tube furnace and heated therein from room temperature to about 1100° C. In most of the test runs an atmosphere of Ar was used in the furnace, although in some cases air or pure nitrogen was used. Gas evolved in the furnace was passed through a Beckman Oxygen Analyzer and a wet test meter. Oxygen evolution began at 550°–600° C. Oxygen analysis and X-ray diffraction and Raman spectroscopy of the resulting solids confirmed that $CeO_2$ had been quantitatively converted to $CePO_4$ as represented by Equation I above. More than 20 different experiments were conducted with various mixtures of $CeO_2$ and $BPO_4$ under varying heating rates and different atmospheres in the furnace.

Other rare earth oxides were also tested with $BPO_4$. Their reactions were confirmed to be:

$$\left. \begin{array}{l} La_2O_3 + 2BPO_4 \rightarrow 2LaPO_4 + B_2O_3 \\ Nd_2O_3 + 2BPO_4 \rightarrow 2NdPO_4 + B_2O_3 \end{array} \right\} \text{similar to Equation II}$$

$$2/7\, Tb_7O_{12} + 2BPO_4 \rightarrow 2TbPO_4 + B_2O_3 + 3/14\, O_2, \text{ similar to Equation I.}$$

Because iron is a major component of many nuclear waste sludges, the following reaction were studied:

$$Fe_2O_3 + mBPO_4 \xrightarrow{(1000°\,C.)} Fe(II)_xFe(III)_y(PO_4)_m + \tfrac{m}{2}B_2O_3 + \tfrac{x}{4}O_2$$

$$Fe_3O_4 + MBPO_4 \xrightarrow{(1100°\,C.)} Fe(II)_xFe(III)_y(PO_4)_m + \tfrac{m}{2}B_2O_3 + \tfrac{x-1}{4}O_2$$

These reactions confirmed that Fe(III) is partially reduced to Fe(II), and from Mossbauer spectra and oxygen evolution measurements, it was established that $x/y \approx 2$; X-ray diffraction of the resulting powders gave an, as yet, unidentifiable pattern.

Reactions of $UO_2$ with $BPO_4$ gave $UP_2O_7$ according to $UO_2 + 2BPO_4 \rightarrow UP_2O_7 + B_2O_3$, similar to Equation III. No $O_2$ evolution occurred, and the solid was identified by X-ray diffraction.

Using a similar apparatus, but located inside a glove box to protect from contamination with $\alpha$-emitters, the reactions of 300–400 mg of $NpO_2$ and $PuO_2$ with $BPO_4$ were studied. The reactions can be represented by $NpO_2 + 2BPO_4 \rightarrow NpP_2O_7 + B_2O_3$ similar to Equation III $(x+y)PuO_2 + (2x+y)BPO_4 \rightarrow x\ PuP_2O_7 + y\ PuPO_4 + zx + y/2\ B_2O_3 + y/4\ O_2$.

Microspectrophotometric analysis of the solid indicated that all of the plutonium was present as trivalent in the product of reaction; X-ray diffraction analysis indicated the presence of some tetravalent plutonium in the form of $PuP_2O_7$.

Additionally 18 mg of $AmO_2$ were reacted with about 19 mg $BPO_4$ under under nitrogen at temperatures up to 1020° C. The product was identified by X-ray diffraction and Raman spectroscopy as $AmPO_4$, but the $O_2$ evolved could not be measured by our analytical method because the amount was too small.

The identity of the product however, permits the deduction that the following reaction took place, similarly to Equation I.

$$2\ AmO_2 + 2\ BPO_4 \rightarrow 2\ AmPO_4 + B_2O_3 + \tfrac{1}{2}O_2$$

The reaction of $BPO_4$ with aluminum fluoride ($AlF_3$) was tested in order to demonstrate the formation of a metal phosphate from $BPO_4$ and a metal compound other than an oxide. The product formed was cristobalite-type $AlPO_4$, identified by X-ray diffraction. The reaction can be described by the equation:

$$AlF_3 + BPO_4 \xrightarrow{950°\ C.} BF_3 + AlPO_4$$

Two lanthanide fluorides, neodymium fluoride ($NdF_3$) and cerium fluoride ($CeF_3$), were reacted with $BPO_4$. The products were identified by Raman spectrophotometry thus confirming the reactions to be:

$$NdF_3 + BPO_4 \rightarrow BF_3 + NdPO_4, \text{ and}$$

$$CeF_3 + BPO_4 \rightarrow BF_3 + CePO_4.$$

Reactions such as represented by Equations I–III should be useful for growing single crystals of metallic phosphates. For such an application, it would be desirable to use a mixture of $BPO_4$, $B_2O_3$ to act as a flux and a small amount of an alkali metal borate, preferably of lithium, to lower the viscosity of the flux. Presently, such crystals (e.g., of rare earth phosphates) are grown from a $Pb_2P_2O_7$ flux, and, as mentioned hereinbefore, the excess flux has to be removed by long periods (weeks) of boiling in concentrated $HNO_3$. The proposed growth method would have the advantage that the excess flux can be removed by water.

What is claimed is:

1. A method of preparing metal phosphate, comprising the steps of:
    preparing a mixture of boron phosphate and a first compound selected from the group consisting of $AlF_3$, $NdF_3$, $La_2O_3$, $Nd_2O_3$, $Tb_7O_{12}$, $AmO_2$, $PuO_2$, $UO_2$, $NpO_2$, $CeO_2$, $Fe_2O_3$, and $Fe_3O_4$; and
    heating said mixture to form a phosphate of the metal in said first compound and a second compound selected from the group consisting of a boron oxide and a boron salt.

* * * * *